United States Patent
Ozawa et al.

(10) Patent No.: US 6,993,203 B2
(45) Date of Patent: Jan. 31, 2006

(54) IMAGE PROCESSING APPARATUS AND IMAGE PROCESSING PROGRAM

(75) Inventors: Akio Ozawa, Kawasaki (JP); Kohei Murao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 551 days.

(21) Appl. No.: 10/206,575

(22) Filed: Jul. 29, 2002

(65) Prior Publication Data

US 2003/0002726 A1    Jan. 2, 2003

Related U.S. Application Data

(63) Continuation of application No. PCT/JP01/02691, filed on Mar. 29, 2001.

(30) Foreign Application Priority Data

Mar. 31, 2000 (JP) .............................. 2000-099673
Mar. 13, 2001 (JP) .............................. 2001-069620

(51) Int. Cl.
*G06K 9/40* (2006.01)
(52) U.S. Cl. ...................... 382/257; 382/132; 382/258; 382/260; 382/308; 382/254
(58) Field of Classification Search ................ 382/257, 382/258, 259, 132, 144, 308, 254, 260, 266; 396/55; 345/469.1, 470
See application file for complete search history.

(56) References Cited

U.S. PATENT DOCUMENTS

| | | | |
|---|---|---|---|
| 4,519,923 A | 5/1985 | Hori et al. | |
| 5,179,419 A * | 1/1993 | Palmquist et al. | 356/73.1 |
| 5,278,954 A * | 1/1994 | Hohlfeld et al. | 707/100 |
| 5,425,113 A | 6/1995 | Ito | |
| 6,169,823 B1 * | 1/2001 | Takeo et al. | 382/308 |
| 6,178,340 B1 * | 1/2001 | Svetliza | 600/310 |
| 6,470,151 B1 * | 10/2002 | Ohsawa | 396/311 |
| 6,704,501 B1 * | 3/2004 | Washisu | 396/55 |

FOREIGN PATENT DOCUMENTS

| | | |
|---|---|---|
| EP | 0 393 619 | 10/1990 |
| EP | 0 424 967 | 5/1991 |
| JP | 02-171873 | 7/1990 |
| JP | 11-259651 | 9/1999 |
| JP | 11-306345 | 11/1999 |

* cited by examiner

*Primary Examiner*—Kanjibhai Patel
*Assistant Examiner*—Ali Bayat
(74) *Attorney, Agent, or Firm*—Staas & Halsey LLP

(57) ABSTRACT

An original image is subjected to an opening processing and to a closing processing to obtain a blurred image by using an average value between the result of the opening processing and the result of the closing processing as a reference for correcting the brightness. The brightness of the original image is corrected by multiplying a difference between the blurred image and the original image, by a ratio of an upper limit value of brightness to a difference between the upper limit value of brightness and the blurred image. Then, the brightness of the original image is corrected based on the blurred image which enhances the contrast of a highly bright portion of a predetermined area or more while lowering the brightness of that portion. Contrast and brightness of the whole image can be adapted to the sensitivity of human eyes.

5 Claims, 16 Drawing Sheets

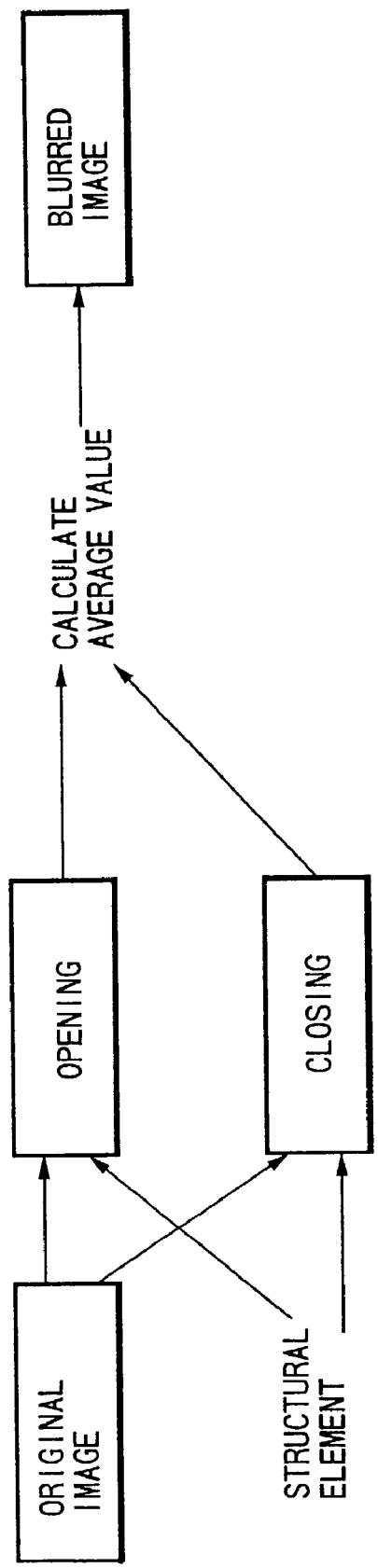

FIG.5

1. INITIALIZE : $out(\bar{x}) = \{MAXVALUE \ (WHEN \ \bar{z} \in G, \bar{x} + \bar{z} \in F), MINVALUE \ (OTHERS)\}$
2. LOOP WITH $\bar{z}$ WHICH SATISFIES $\bar{z} \in G$
3. LOOP WITH $\bar{x}$ WHICH SATISFIES $\bar{x} + \bar{z} \in F$
4. $out(\bar{x}) = \min(out(\bar{x}), f(\bar{x} - \bar{z}) - g(\bar{z}))$
5. if $out(\bar{x}) > MINVALUE$ then $out(\bar{x}) = MINVALUE$
6. RETURN 3.
7. RETURN 2.

1. INITIALIZE : $out(\bar{x})$ = MINVALUE
2. LOOP WITH $\bar{z}$ WHICH SATISFIES $\bar{z} \in G$
3.     LOOP WITH $\bar{x}$ WHICH SATISFIES $\bar{x} - \bar{z} \in F$
4.         $out(\bar{x}) = \max(out(\bar{x}), f(\bar{x} - \bar{z}) + g(\bar{z}))$
5.         if $out(\bar{x})$ > MAXVALUE then $out(\bar{x})$ = MAXVALUE
6.     RETURN 3.
7. RETURN 2.

FIG.9

| 0 | 2 | 2 | 2 | 2 | 2 | 2 | 2 | 2 | 2 | 0 |
|---|---|---|---|---|---|---|---|---|---|---|
| 2 | 2 | 8 | 8 | 2 | 2 | 2 | 8 | 8 | 2 | 2 |
| 2 | 8 | 8 | 8 | 8 | 2 | 8 | 8 | 8 | 8 | 2 |
| 8 | 8 | 8 | 8 | 8 | 8 | 8 | 8 | 8 | 8 | 8 |
| 2 | 8 | 8 | 8 | 8 | 2 | 8 | 8 | 8 | 8 | 2 |
| 2 | 6 | 6 | 6 | 6 | 10 | 6 | 6 | 6 | 6 | 2 |
| 2 | 2 | 6 | 6 | 10 | 10 | 10 | 6 | 6 | 2 | 2 |
| 2 | 2 | 2 | 10 | 10 | 10 | 10 | 10 | 2 | 2 | 2 |
| 2 | 2 | 2 | 4 | 10 | 10 | 10 | 4 | 2 | 2 | 2 |
| 2 | 2 | 4 | 4 | 4 | 4 | 4 | 4 | 4 | 2 | 2 |
| 0 | 2 | 2 | 4 | 4 | 4 | 4 | 4 | 2 | 2 | 0 |
| 0 | 0 | 2 | 2 | 4 | 4 | 4 | 2 | 2 | 0 | 0 |
| 0 | 0 | 0 | 2 | 2 | 2 | 2 | 2 | 0 | 0 | 0 |

| 0 | 0 | 0 | 0 | 0 | 0 | 0 | 0 | 0 | 0 | 0 |
|---|---|---|---|---|---|---|---|---|---|---|
| 0 | 1 | 2 | 2 | 2 | 2 | 2 | 2 | 2 | 1 | 0 |
| 0 | 2 | 5 | 7 | 2 | 2 | 2 | 7 | 5 | 2 | 0 |
| 0 | 5 | 7 | 7 | 7 | 2 | 7 | 7 | 7 | 5 | 0 |
| 0 | 2 | 4 | 6 | 2 | 2 | 2 | 6 | 4 | 2 | 0 |
| 0 | 2 | 6 | 6 | 6 | 2 | 6 | 6 | 6 | 2 | 0 |
| 0 | 2 | 2 | 6 | 4 | 6 | 4 | 6 | 2 | 2 | 0 |
| 0 | 2 | 2 | 2 | 6 | 6 | 6 | 2 | 2 | 2 | 0 |
| 0 | 2 | 2 | 2 | 3 | 3 | 3 | 2 | 2 | 2 | 0 |
| 0 | 2 | 2 | 3 | 3 | 3 | 3 | 3 | 2 | 2 | 0 |
| 0 | 0 | 2 | 2 | 3 | 3 | 3 | 2 | 2 | 0 | 0 |
| 0 | 0 | 0 | 2 | 2 | 2 | 2 | 2 | 0 | 0 | 0 |
| 0 | 0 | 0 | 0 | 0 | 0 | 0 | 0 | 0 | 0 | 0 |

FIG.17

| 0 | 0 | 0 | 0 | 0 | 0 | 0 | 0 | 0 | 0 | 0 |
|---|---|---|---|---|---|---|---|---|---|---|
| 0 | 2 | 2 | 2 | 2 | 2 | 2 | 2 | 2 | 2 | 0 |
| 0 | 2 | 7 | 6 | 2 | 2 | 2 | 6 | 7 | 2 | 0 |
| 0 | 7 | 6 | 6 | 6 | 2 | 6 | 6 | 6 | 7 | 0 |
| 0 | 2 | 0 | 3 | 2 | 2 | 2 | 3 | 0 | 2 | 0 |
| 0 | 2 | 3 | 3 | 3 | 2 | 3 | 3 | 3 | 2 | 0 |
| 0 | 2 | 2 | 3 | 0 | 10 | 0 | 3 | 2 | 2 | 0 |
| 0 | 2 | 2 | 2 | 10 | 10 | 10 | 2 | 2 | 2 | 0 |
| 0 | 2 | 2 | 2 | 1 | 1 | 1 | 2 | 2 | 2 | 0 |
| 0 | 2 | 2 | 3 | 3 | 3 | 3 | 3 | 2 | 2 | 0 |
| 0 | 0 | 2 | 2 | 3 | 3 | 3 | 2 | 2 | 0 | 0 |
| 0 | 0 | 0 | 2 | 2 | 2 | 2 | 2 | 0 | 0 | 0 |
| 0 | 0 | 0 | 0 | 0 | 0 | 0 | 0 | 0 | 0 | 0 |

IMAGE PROCESSING APPARATUS AND IMAGE PROCESSING PROGRAM

This application is a continuation of PCT/JP01/02691, filed on Mar. 29, 2001.

TECHNICAL FIELD

The present invention relates to technology for adapting the contrast and brightness of the whole image to the sensitivity of human eyes.

BACKGROUND ART

The X-ray image (CR image) for medical treatment is usually so shot that the portions where a transmission amount of X-ray is large appear dark, and is read by medical doctors. In the thus shot X-ray image, however, highly bright portions appear to be dazzling. Therefore, doctors who have to read many X-ray images a day often cover the highly bright portions with a paper for the purpose of lowering fatigue in the eyes. However, the highly bright portions have low detection sensitivity of the X-rays from the first. Besides, human eyes have low sensitivity to the highly bright portions. Therefore, it is difficult for doctors to read the highly bright portions.

In recent years, digitization of images for medical use has been developed, and the following image processing has been performed to solve the above-mentioned problem. That is, to read dark portions in detail, the image is so processed as to widen a range of low brightness by sacrificing the highly bright portions. To read bright portions in detail, on the other hand, the image is so processed as to widen a range of high brightness to cover even low brightness by sacrificing the lowly bright portions. With this image processing, however, either the dark portions or the bright portions become clear, but it is impossible to simultaneously read the dark portions and the bright portions, leading a possibility of overlooking the lesion sites.

In order to make the whole image more easy to read, therefore, there have been proposed methods called dynamic range filter for suppressing the highly bright portions and unsharp masking for enhancing the contrast (see Lecture 14 on the Science of Medical Radiogenics, "Medical Image Engineering").

The dynamic range filter is not capable of enhancing the contrast of fine texture in the highly bright portions. Therefore, the contrast becomes weak in the bright portions, and the image as a whole becomes to appear flat.

The unsharp masking, on the other hand, creates an averaged blurred image or creates a blurred image utilizing the frequency conversion, and enhances a difference between the original image and the blurred image to improve the contrast. The highly bright portions, however, are still dazzling. In the portions where the contrast is high from the first, there occurs Gibbs' phenomenon as shown in FIG. 18, leading a possibility of misdiagnosis. In the case of a CR image of the chest shot in a health examination, the contrast is very strong along the circumference of the lung. If the unsharp masking is effected, therefore, a shadow-like portion appears along the edge of the lung, leading a possibility to misdiagnose as pneumothorax. By effecting the unsharp masking, further, an upper limit value of brightness is often exceeded in the highly bright portions.

In view of the above-mentioned problems, therefore, it is an object of the present invention to provide an image processing apparatus and an image processing program capable of adapting the contrast and brightness of the whole image to the sensitivity of human eyes, while preventing Gibbs' phenomenon in the high contrast portions.

DISCLOSURE OF THE INVENTION

In order to achieve the above-mentioned object, an image processing apparatus according to the present invention comprises a blurred image creating device for creating a blurred image by subjecting an original image to an erosion processing and to a dilation processing, and a brightness correction device for correcting the brightness of the original image based on the blurred image created by the blurred image creating device.

According to this constitution, the blurred image is created by subjecting the original image to the erosion processing and to the dilation processing. In the thus created blurred image, a variation of the brightness in a region narrower than a predetermined area is neglected, while a change in the variation of the brightness in a region of the predetermined area or more is correctly reflected. Then, the brightness of the original image is corrected based on the blurred image.

In the original image, therefore, the brightness in the highly bright portion of the predetermined area or more is lowered, while the contrast becomes high in this portion. Thus, it is possible to adapt the contrast and brightness of the whole image to the sensitivity of human eyes while preventing the occurrence of Gibbs' phenomenon on the portions where the contrast is high.

The blurred image creating device may be constructed to comprise an opening processing device for realizing an opening processing by subjecting the original image to the erosion processing and to the dilation processing successively; a closing processing device for realizing a closing processing by subjecting the original image to the dilation processing and to the erosion processing successively; and a brightness average value computing device for computing an average value between brightness of the original image subjected to the opening processing by the opening processing device and brightness of the original image subjected to the closing processing by the closing processing device, to use the computed result as the blurred image.

According to this constitution, the opening processing is realized by subjecting the original image to the erosion processing and to the dilation processing successively, and the closing processing is realized by subjecting the original image to the dilation processing and to the erosion processing successively. Then, the average value between brightness of the original image subjected to the opening processing and brightness of the original image subjected to the closing processing, is computed, and the computed result is used as the blurred image. Therefore, it is possible to easily create the blurred image as a brightness correction reference for enhancing the contrast of the highly bright portion the predetermined area or more, while lowering the brightness of that portion.

Further, the brightness correction device may correct the brightness of the original image by multiplying a difference between the blurred image created by the blurred image creating device and the original image, by a ratio of an upper limit value of brightness to a difference between the upper limit value of brightness and the blurred image.

According to this constitution, the brightness of the original image is corrected by multiplying the difference between the blurred image and the original image by the ratio of the upper limit value of brightness to the difference between the upper limit value of brightness and the burred image. It is therefore possible to simultaneously realize the lowering of brightness and the enhancement of contrast of highly bright portions the predetermined area or more through one time of processing.

There may be further provided a brightness specifying device for specifying a minimum brightness with which the brightness is corrected, and the brightness correction device corrects the brightness of the original image for only pixels having brightness equal to or greater than the minimum brightness specified by the brightness specifying device.

According to this constitution, the brightness of the original image is corrected for only pixels having brightness equal to or greater than the minimum brightness specified by the brightness specifying device. By setting the minimum brightness depending on the state of the original image, therefore, it is possible to prevent the lowering of the brightness of the lowly bright portions.

There may be further provided a region specifying device for specifying a region of which brightness is to be corrected, and the brightness correction device corrects the brightness of the original image for only pixels included in the region specified by the region specifying device.

According to this constitution, the brightness of the original image is corrected for only pixels included in the region specified by the region specifying device. Therefore, it becomes possible to perform the image processing for only regions to where the users pay attention, thereby enabling to improve performance of the image processing apparatus without performing unnecessary image processing.

An image processing program according to the present invention, on the other hand, is characterized to realize on a computer a blurred image creating function for creating a blurred image by subjecting an original image to an erosion processing and to a dilation processing, and a brightness correction function for correcting the brightness of the original image based on the blurred image created by the blurred image creating function.

According to this constitution, in addition to the function and effect of the image processing apparatus of the present invention, the image processing apparatus of the present invention can be easily constructed by downloading the program through an electric communication line, provided that the image processing program to realize the blurred image creating function and the brightness correction function on the computer has been registered on a server connected to Internet.

BRIEF DESCRIPTION OF DRAWINGS

FIG. 3 is a flow diagram illustrating a processing for creating a blurred image;

FIG. 4 is a diagram illustrating an erosion processing, wherein

FIG. 5 is a diagram explaining a program for realizing the erosion processing;

FIG. 6 is a diagram illustrating a specific example of the erosion processing, wherein FIG. 6A is a diagram of a structural element, FIG. 6B is a diagram of an original image, FIG. 6C is a diagram illustrating the order of processing, and FIG. 6D is a diagram explaining the processed result;

FIG. 8 is a diagram explaining a program for realizing the dilation processing for the original image shown in FIG. 6B;

FIG. 9 is a diagram explaining the result of the dilation processing;

FIG. 12 is a diagram illustrating the result of the opening processing for the original image shown in FIG. 6B;

FIG. 13 is a diagram explaining the result of the closing processing for the original image shown in FIG. 6B;

FIG. 14 is a diagram illustrating a principle for creating the blurred image, wherein

FIG. 15 is a diagram of a blurred image created from the original image shown in FIG. 6B;

FIG. 16 is a diagram illustrating a brightness correction based on the blurred image, wherein

FIG. 17 is a diagram explaining the result of correcting the brightness of the original image shown in FIG. 6B.

BEST MODE FOR CARRYING OUT THE INVENTION

The present invention will now be described below in detail with reference to the accompanying drawings.

Figure 1:
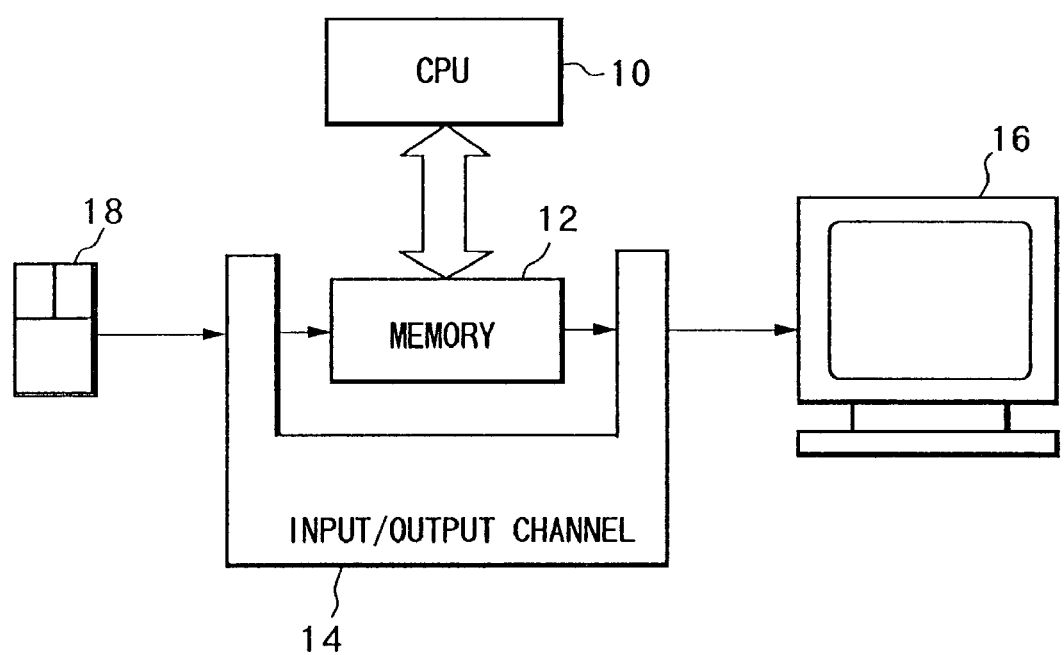
FIG. 1 is a diagram illustrating the constitution of an image processing apparatus according to the present invention.

Referring to FIG. 1, an image processing apparatus according to the present invention (hereinafter simply referred to as "image processing apparatus") is constructed on a computer system which includes a central processing unit (CPU) 10, a memory 12 which is a main storage unit, an input/output channel 14, a display unit 16 and a mouse 18. In the image processing apparatus, an image processing that will be described later is performed in accordance with a program loaded in the memory 12.

The program loaded in the memory 12 realizes a blurred image creating device, a brightness correction device, a opening processing device, a closing processing device, a brightness average value computing device, a brightness specifying device, a region specifying device, a blurred image creating function and a brightness correction function.

Figure 2:
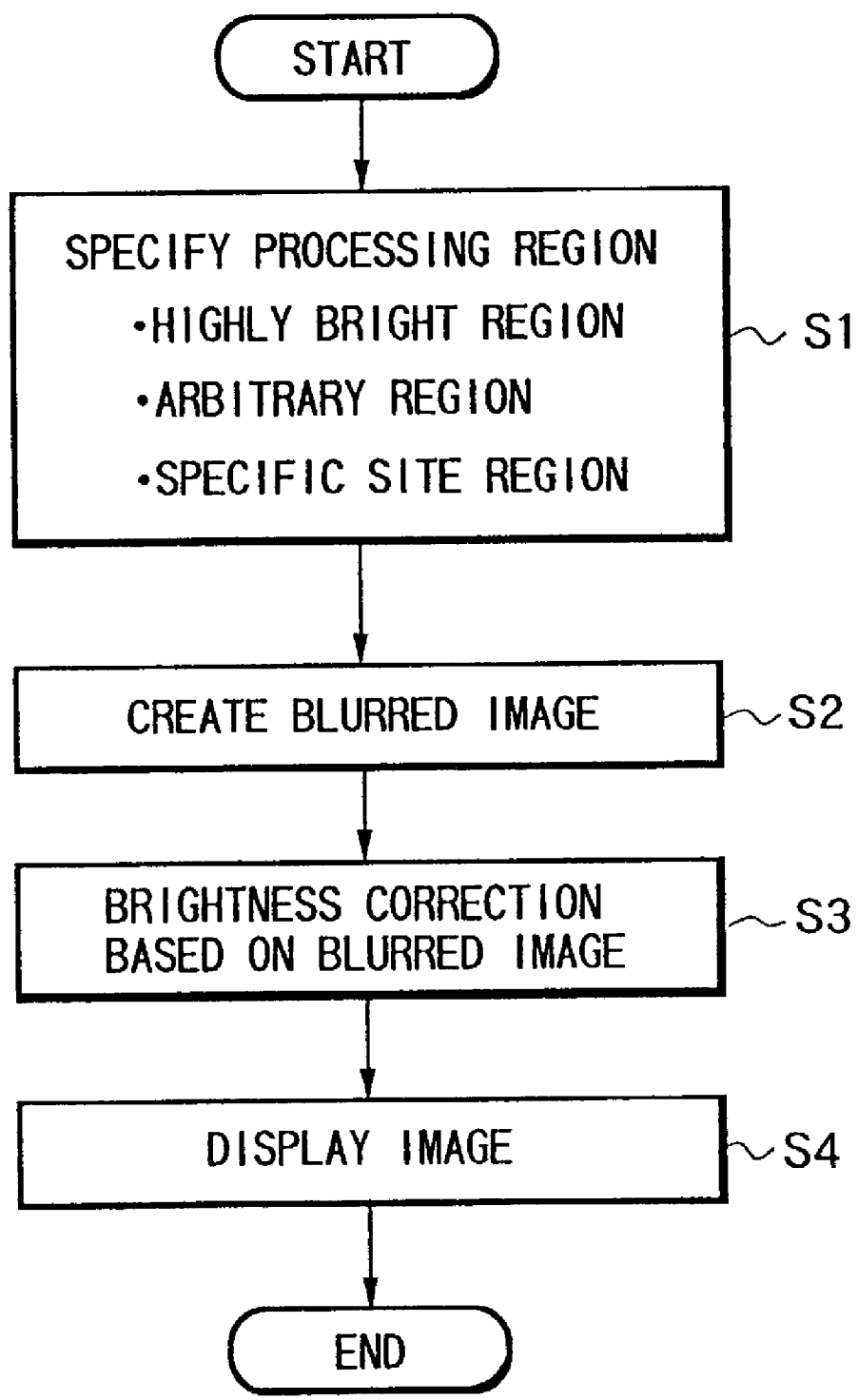
FIG. 2 is a flowchart illustrating the content of image processing in the image processing apparatus according to the present invention.

FIG. 2 is a flowchart illustrating the outline of the content of the image processing.

At step 1 (abbreviated as "S1" in the figure, the same rule is applied hereinafter), a processing region is specified for the image processing. The processing region includes a highly bright region, an arbitrary region, a specific site region, etc. The highly bright region is the one where the image is processed for only pixels having brightness equal to or higher than predetermined brightness (minimum brightness), and is specified via a threshold value that specifies the predetermined brightness. The arbitrary region is the one where the image is processed for only pixels included in a specified region, and is specified through the mouse 18. The specific site region is the one where the image is processed for only a specified site of the image, such as lung in a CR image of chest, and is specified in cooperation with a site recognizing function. The processing region may be specified by combining at least two of the highly bright region, arbitrary region and specific site region.

Here, a device for specifying the threshold value related to the highly bright region corresponds to the brightness specifying device, and a device for specifying the region related to the arbitrary region corresponds to the region specifying device.

At step 2, there is created a blurred image that serves as a reference for correcting the brightness of an original image. The blurred image is created by a method called morphology for analyzing a structure of image in compliance with a flow diagram shown in FIG. 3. Creation of the blurred image will now be described in detail as follows. A processing at step 2 corresponds to the blurred image creating device and to the blurred image creating function.

First, the original image is subjected to an opening processing and to a closing processing. The opening processing is the one for smoothing small protuberances of the image, and the closing processing is the one for smoothing small dents of the image. The opening processing and the closing processing are realized by a combination of an erosion processing and a dilation processing.

The erosion processing and the dilation processing are the ones for removing dents and protuberances smaller than a structural element from the image. Here, the structural element is the one used for the computation of the image, and is, for example, a region surrounded by a circle of a diameter which is 1/40 the number of pixels along one side of the image. When the scale among the pixels is obvious, the diameter of the structural element can be defined to be 9 cm. That is, in the morphology, the structural element constituted by an arbitrary region can be specified.

Figure 4A:
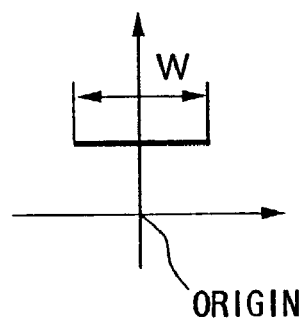
FIG. 4A is a diagram of a structural element and FIG. 4B is a diagram explaining a processing by using the structural element of FIG. 4A.
Figure 4B:
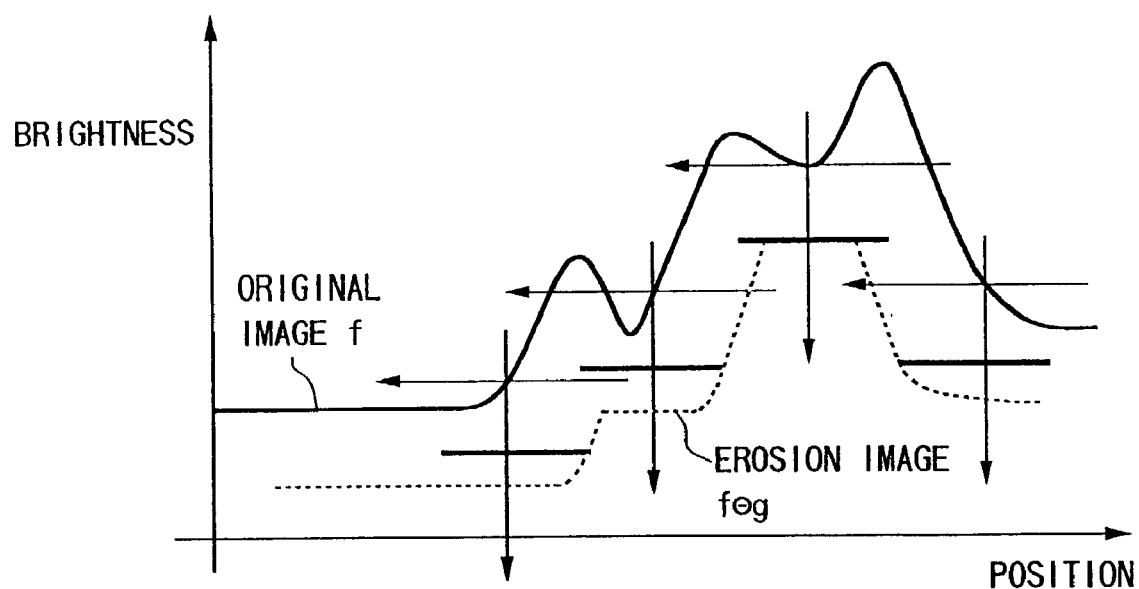

In the erosion processing as shown in FIG. 4, protuberances smaller than the structural element are removed from the image. That is, by using the structural element shown in FIG. 4A, when the origin is moved in parallel along the original image in a state where the structural element is turned upside down as shown in FIG. 4B of, a minimum value of brightness in the width W of the original image becomes an output image.

If an input image is $f(\bar{x})$, the structural element is $g(\bar{x})$ and a value that can be assumed by the structural element $g(\bar{x})$ is $\bar{z}$, then, the erosion processing is realized by the program shown in FIG. 5. That is, after the output image out($\bar{x}$) is initialized, a minimum value of the input image $f(\bar{x})$ becomes an output image out($\bar{x}$) in the region of the structural element $g(\bar{x})$. In FIG. 5, MINVALUE and MAX VALUE represent a minimum value of brightness and a maximum value thereof (upper limit value of brightness).

The erosion processing $(f \ominus g)(\bar{x})$ is defined as follows.

$$(f \ominus g)(\bar{x}) = \min_{\substack{\bar{z} \in G \\ \bar{x}+\bar{z} \in F}} (f(\bar{x}+\bar{z}) - g(\bar{z}))$$

where F is a region where the input image $f(\bar{x})$ is defined and G is a region where the structural element $g(\bar{x})$ is defined (the same rule is applied hereinafter).

Figures 6A, 6B, 6C, 6D:
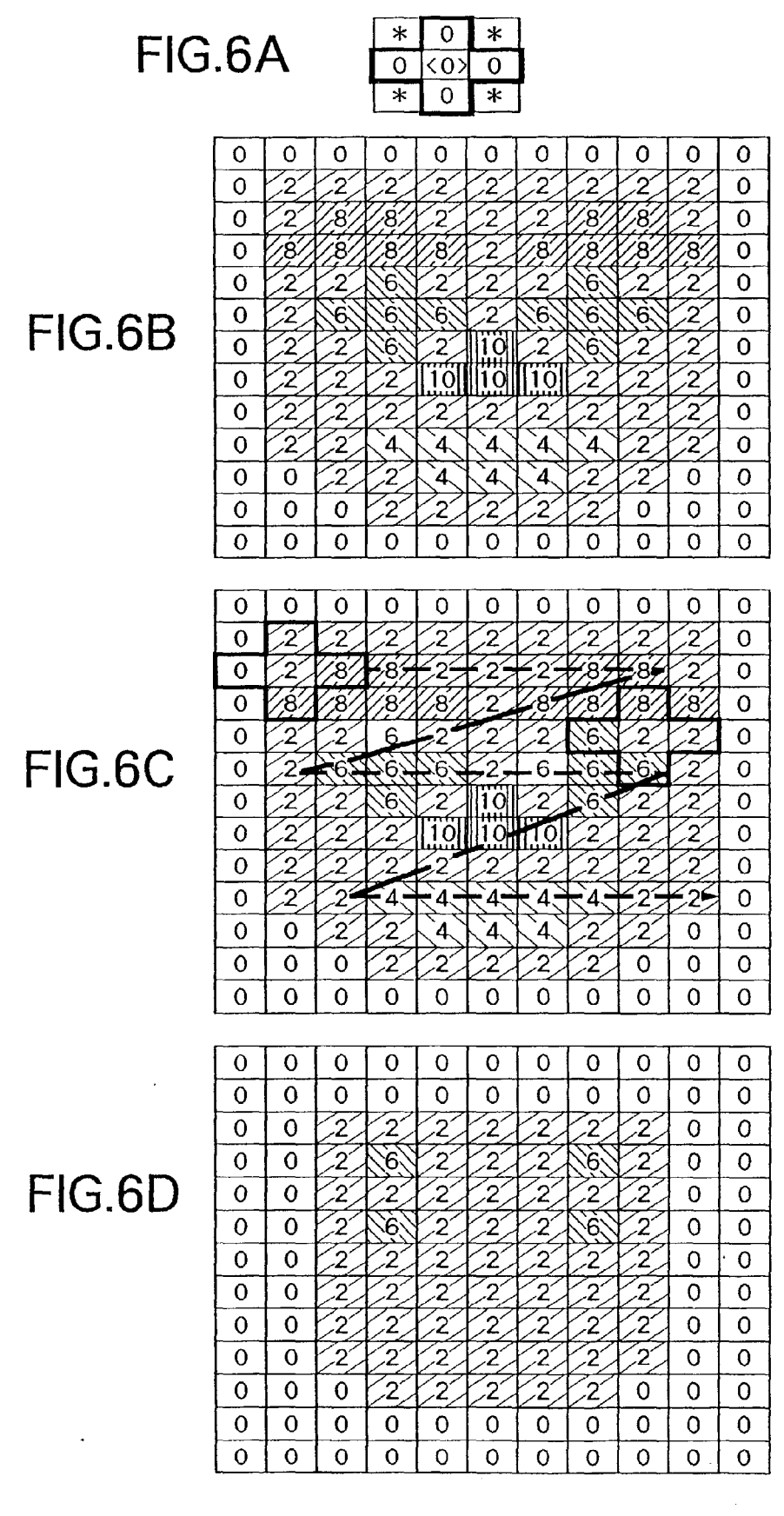

Next, described below is what it will be if the original image shown in FIG. 6B is subjected to the erosion processing by using a structural element of a crossing shape shown in FIG. 6A. In the structural element of FIG. 6A, "<>" represents origin and "*" represents outside the region. Further, numerals in the regions of the structural element represent values that can be assumed by the structural element.

When the original image shown in FIG. 6B is to be subjected to the erosion processing, the processing is executed for the pixels from the left upper part of the original image toward the right lower part thereof as shown in FIG. 6C. If the definition formula in the erosion processing is adapted when the structural element is located on the left upper part in FIG. 6C, then, min(2−0, 0−0, 2−0, 8−0, 8−0)=0 and the computed value becomes 0. Further, if the definition formula in the erosion processing is adapted when the structural element is located on the right upper part in FIG. 6C, then, min(8−0, 6−0, 2−0, 2−0, 6−0)=2 and the computed value becomes 2. If the erosion processing is executed for the whole pixels, then, the result becomes as shown in FIG. 6D. Here, the values of pixels in FIG. 6B to FIG. 6D represent brightness (the same rule is applied hereinafter).

Figure 7:
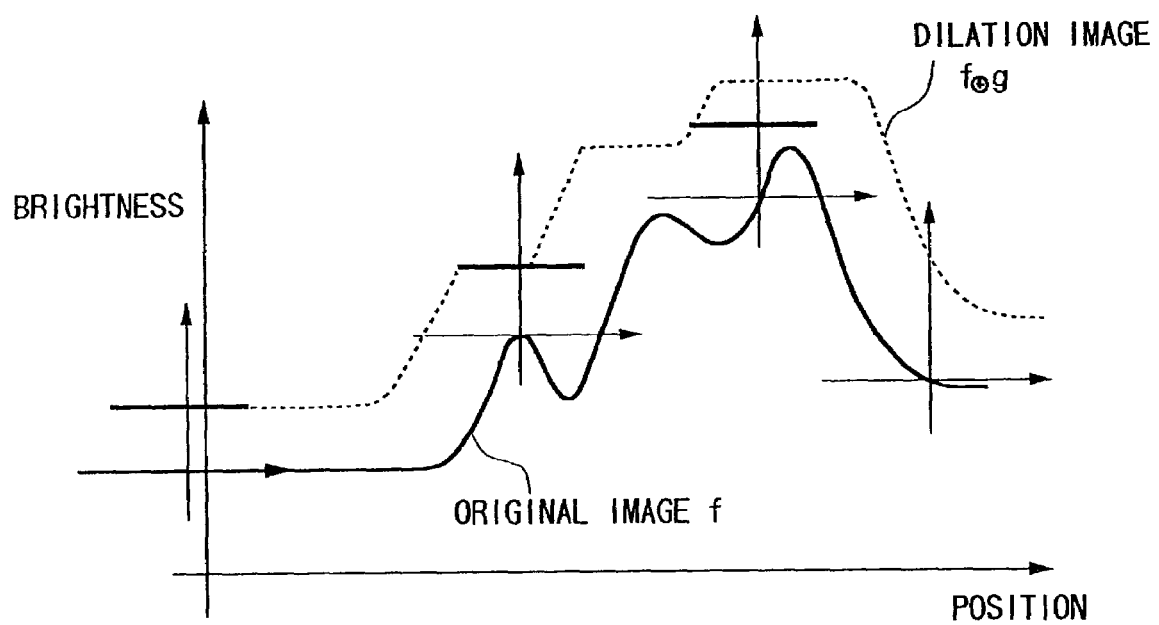
FIG. 7 is a diagram explaining a dilation processing.

In the dilation processing as shown in FIG. 7, dents smaller than the structural element are removed from the image. That is, by using the same structural element (refer to FIG. 4A) as that of the erosion processing, when the origin of the structural element is moved in parallel along the original image, a maximum value of brightness in the width W of the original image becomes an output image.

The dilation processing is realized by a program shown in FIG. 8. That is, after the output image out($\bar{x}$) is initialized, a maximum value of the input image $f(\bar{x})$ becomes an output image out($\bar{x}$) in the region of the structural element $g(\bar{x})$. The dilation processing $(f \oplus g)(\bar{x})$ is defined as follows.

$$(f \oplus g)(\bar{x}) = \max_{\substack{\bar{z} \in G \\ \bar{x}-\bar{z} \in F}} (f(\bar{x}-\bar{z}) + g(\bar{z}))$$

Next, described below is what it will be if the original image shown in FIG. 6B is subjected to the dilation processing by using the structural element of the crossing shape shown in FIG. 6A like in the erosion processing.

When the original image shown in FIG. 6B is to be subjected to the erosion processing, the processing is executed for the pixels from the left upper part of the original image toward the right lower part thereof as shown in FIG. 6C. If the definition formula in the dilation processing is adapted when the structural element is located on the left upper part in FIG. 6C, then, $$\max(2+0, 0+0, 2+0, 8+0, 8+0)=8$$

and the computed value becomes 8. Further, if the definition formula in the dilation processing is adapted when the structural element is located on the right upper part in FIG. 6C, then, $$\max(8+0, 6+0, 2+0, 2+0, 6+0)=8$$

and the computed value becomes 8. If the dilation processing is executed for the whole pixels, then, the result becomes as shown in FIG. 9.

The opening processing and the closing processing are realized by a combination of the above-mentioned erosion processing and dilation processing. That is, if the definition formula of the opening processing is $(f \circ g)(\overline{x})$ and the definition formula of the closing processing is $(f \bullet g)(\overline{x})$, then, $$(f \circ g)(\overline{x}) = (f \oplus (f \ominus g))(\overline{x})$$

$$(f \bullet g)(\overline{x}) = (f \ominus (f \oplus g))(\overline{x})$$

Figure 10:
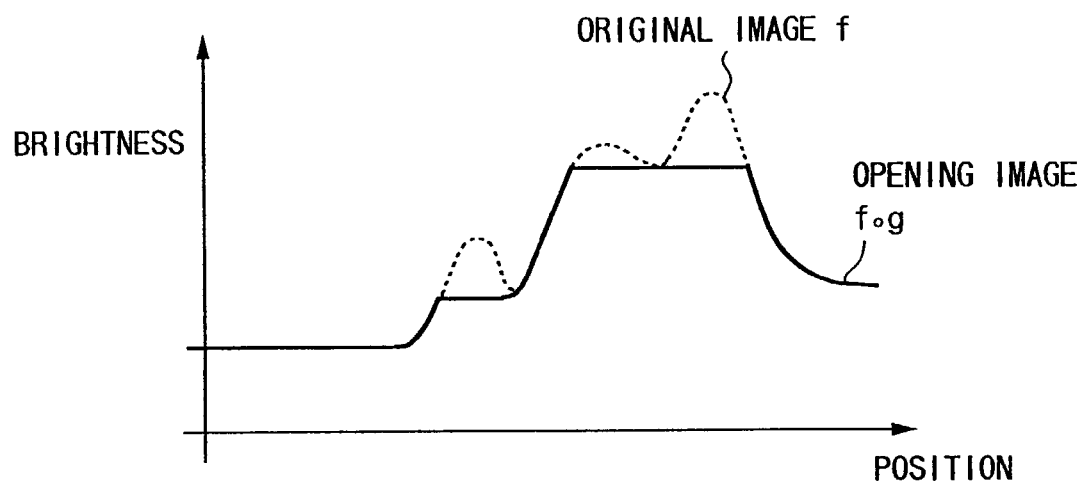
FIG. 10 is a diagram explaining the result of an opening processing.
Figure 11:
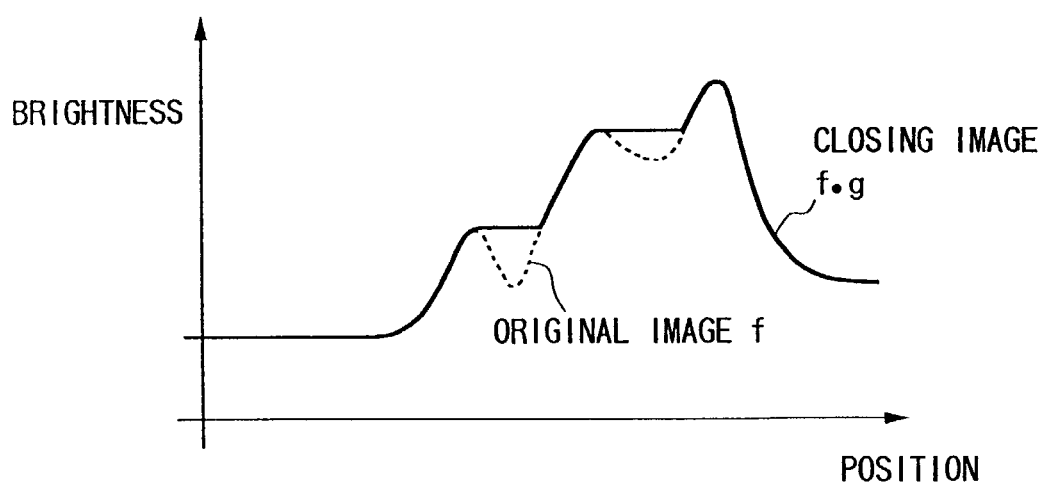
FIG. 11 is a diagram explaining the result of a closing processing.
Figures 12, 13:
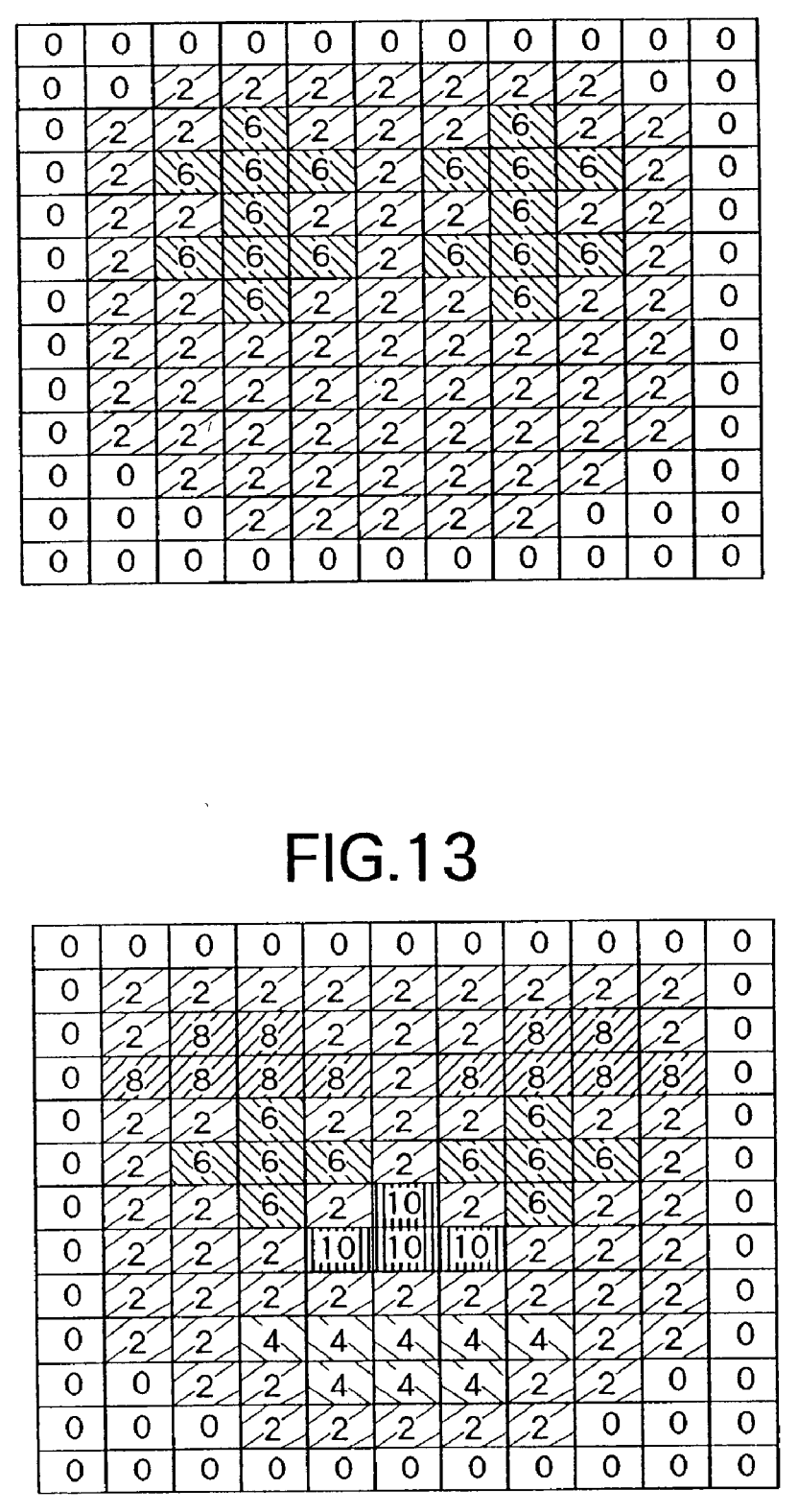

In effect, the opening processing is realized by subjecting the dilation processing subsequently to the erosion processing, and the closing processing is realized by subjecting the erosion processing subsequently to the dilation processing. By subjecting the opening processing and the closing processing, small dents and protuberances in the original image are smoothed as shown in FIGS. 10 and 11. FIGS. 12 and 13 show the results that the original image shown in FIG. 6B is subjected to the opening processing and to the closing processing.

A series of processing for realizing the opening processing and the closing processing by combining the erosion processing and the dilation processing corresponds to the opening processing device and to the closing processing device.

Figure 14A:
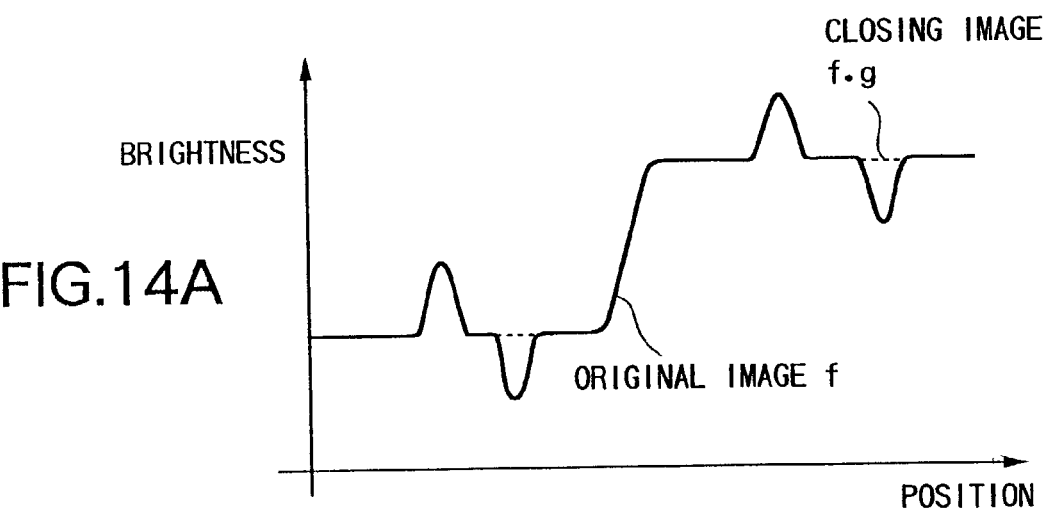
FIG. 14A is a diagram illustrating the result of the closing processing.
Figure 14B:
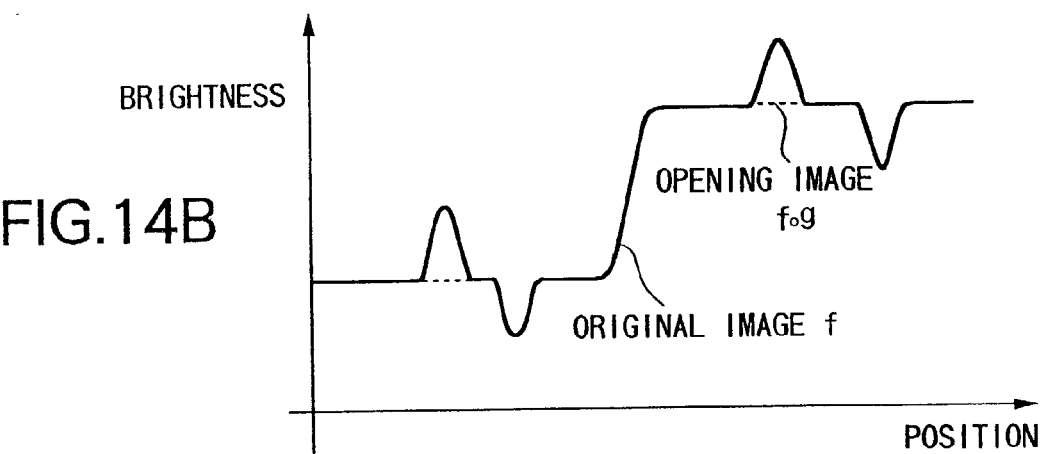
FIG. 14B is a diagram illustrating the result of the opening processing.
Figure 14C:
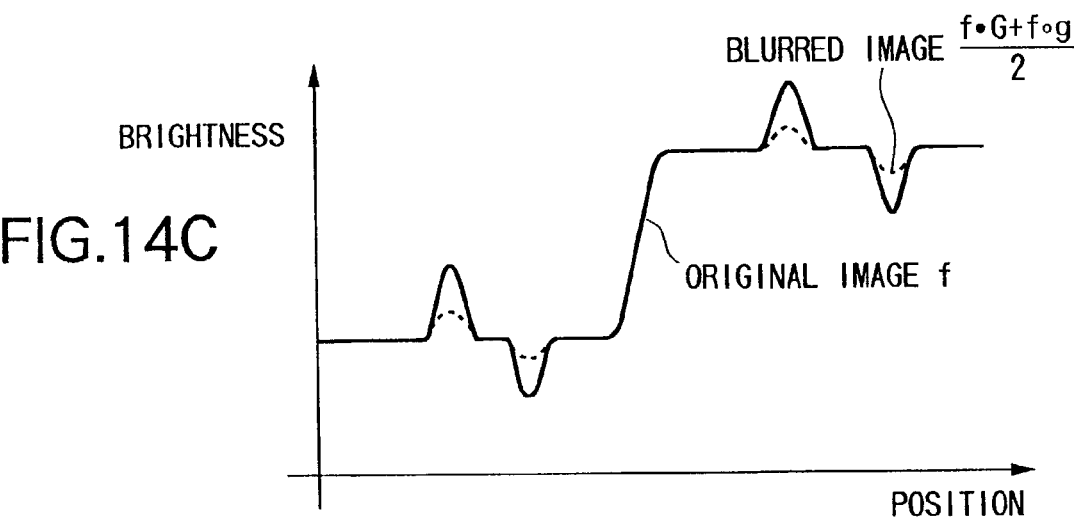
FIG. 14C is a diagram explaining a blurred image created.

Thereafter, the result of the opening processing shown in FIG. 14A and the result of the closing processing shown in FIG. 14B are simply averaged to create a blurred image as shown in FIG. 14C. FIG. 15 illustrates the blurred image created from the original image shown in FIG. 6B. Here, the processing for creating the blurred image by simply averaging the result of the opening processing and the result of the closing processing, corresponds to the brightness average value computing device.

At step 3, the brightness is corrected based on the blurred image. The processing at step 3 corresponds to the brightness correction device and to the brightness correction function.

That is, in correcting the brightness for the pixels having brightness equal to or greater than the threshold value, if the input image is $f(\overline{x})$, the blurred image is $b(\overline{x})$, a load coefficient is k and the threshold value is t, then, the output image $\text{out}(\overline{x})$ is defined as follows.

$$\text{out}(\overline{x}) = \begin{cases} f(\overline{x}) & (\text{when } k \cdot b(\overline{x}) - t \le 0) \\ MINVALUE & (\text{when } f(\overline{x}) - (k \cdot b(\overline{x}) - t) \le 0) \\ \{f(\overline{x}) - (k \cdot b(\overline{x}) - t)\} \cdot \dfrac{MAXVALUE}{MAXVALUE - (k \cdot b(\overline{x}) - t)} & (\text{others}) \end{cases}$$

Here, the load coefficient k ($0 \le k \le 1$) provides a function for finely adjusting the brightness; i.e., the brightness in the highly bright portion is lowered and the contrast is enhanced as the load coefficient k approaches 1. Usually, the load coefficient k is set to be approximately 0.8. In the case of the CR image of the chest, for example, the threshold value t is set to be approximately 25% of the whole tones in order to maintain the brightness nearly the same as that of inside the lung. In the image having 1024 tones, the threshold value t is set to be 256. The load coefficient k and the threshold value t can be set by the users.

Figure 16A:
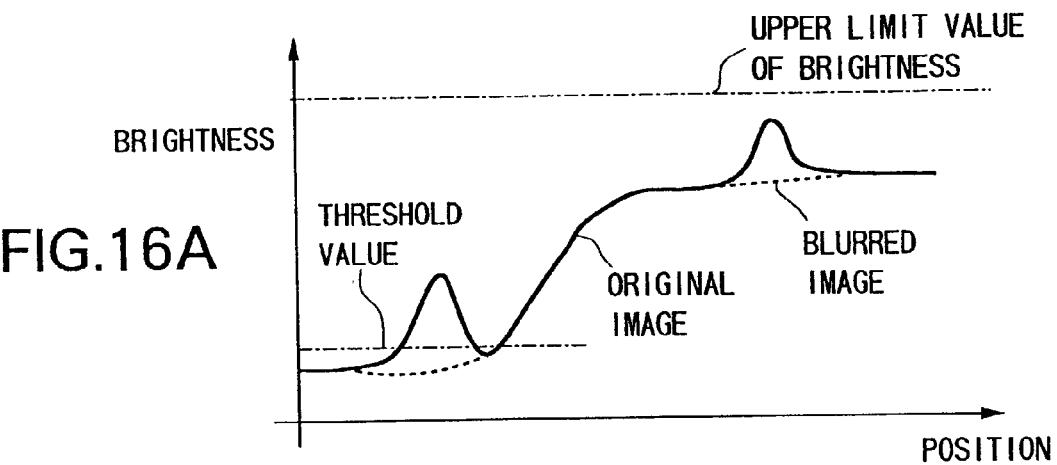
FIG. 16A is a diagram of a threshold value for the original image and the blurred image.
Figure 16B:
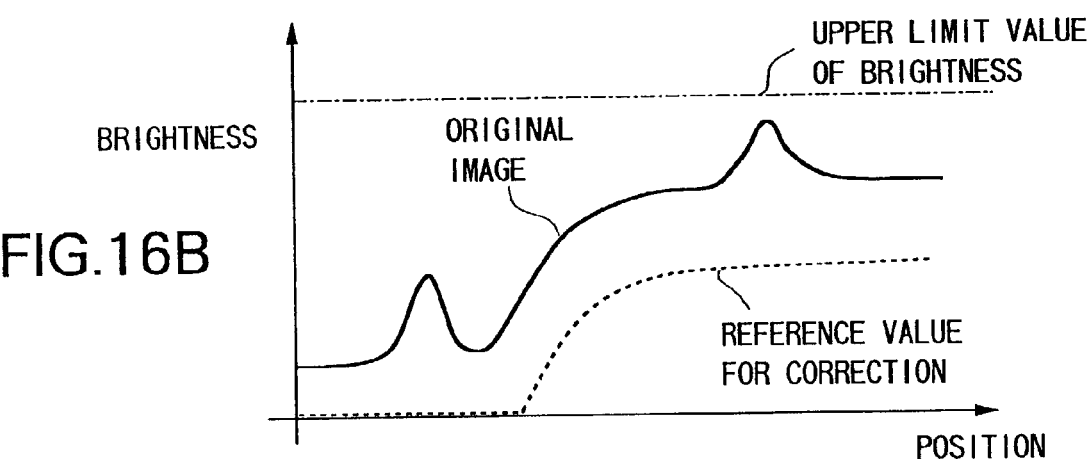
FIG. 16B is a diagram illustrating the correction of the blurred image by using the threshold value.
Figure 16C:
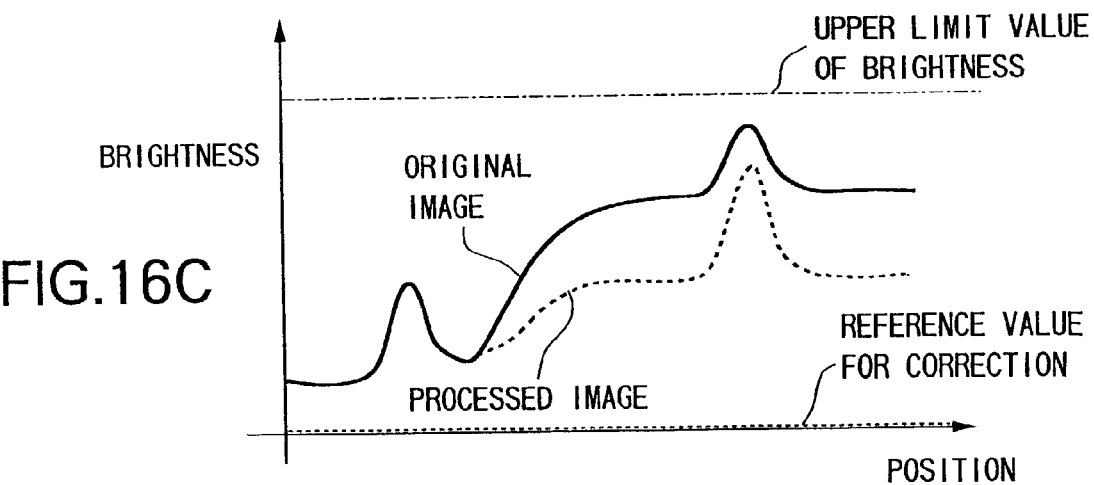
FIG. 16C is a diagram explaining the correction result of brightness.
Figure 18:
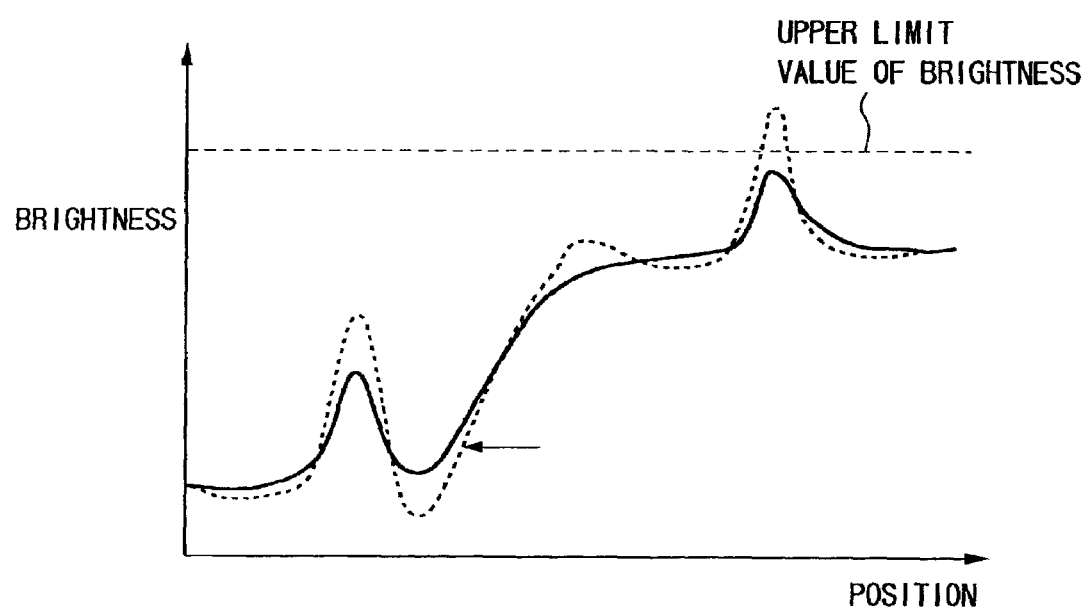
FIG. 18 is a diagram explaining a problem of an unsharp masking.

Then, as shown in FIG. 16A and FIG. 16B, the blurred image is lowered by the amount of the threshold value and is expanded until the brightness 0 is reached with the upper limit value of brightness as a base line, thereby to correct the brightness as shown in FIG. 16C. That is, the brightness of the original image is corrected by multiplying a difference between the blurred image and the original image, by a ratio of an upper limit value of brightness to a difference between the upper limit value of brightness and the blurred image. The original image shown in FIG. 6B becomes finally as shown in FIG. 17.

At step 4, the image of which brightness has been corrected is displayed on the display unit 16.

According to the above-mentioned processing, as shown in FIG. 16C, the brightness of the original image is lowered and the contrast thereof is enhanced in the portions having brightness higher than the threshold value t and having areas wider than the structural element. Therefore, without the lowering of brightness in the lowly bright portions having brightness lower than the threshold value t, the contrast can be enhanced while lowering the brightness in the highly bright portion. Further, the contrast and the brightness of the whole image can be adapted to the sensitivity of human eyes while preventing the occurrence of the Gibbs' phenomenon in the portions where the contrast is strong.

As a result, it is possible to obtain an image of which quality is so high that the whole image can be read at a glance. In reading the CR image, therefore, it is possible for the doctors to diagnose the lesion sites from the whole image, to improve diagnosis accuracy.

If the image processing program according to the present invention is registered on a server connected to the Internet, the image processing apparatus according to the present invention can be easily constructed by down-loading the program through an electric communication line.

INDUSTRIAL APPLICABILITY

As described above, the image processing apparatus and the image processing program according to the present invention make it possible to adapt the contrast and brightness of the whole image to the sensitivity of human eyes while preventing the occurrence of Gibbs' phenomenon in the portions where the contrast is strong.

What is claimed is:

1. An image processing apparatus, including a blurred image creating device for creating a blurred image by subjecting an original image to an erosion processing and to a dilation processing, and a brightness correction device for correcting the brightness of said original image based on the blurred image created by the blurred image creating device, wherein said blurred image creating device comprises:
- an opening processing device for realizing an opening processing by subjecting said original image to the erosion processing and to the dilation processing successively;
- a closing processing device for realizing a closing processing by subjecting said original image to the dilation processing and to the erosion processing successively; and
- a brightness average value computing device for computing an average value between brightness of the original image subjected to the opening processing by said opening processing device and brightness of the original image subjected to the closing processing by said closing processing device, to use the computed result as the blurred image.

2. An image processing apparatus according to claim 1, wherein said brightness correction device corrects the brightness of said original image by multiplying a difference between the blurred image created by said blurred image creating device and the original image, by a ratio of an upper limit value of brightness to a difference between the upper limit value of brightness and the blurred image.

3. An image processing apparatus according to claim 1, further comprising a brightness specifying device for specifying a minimum brightness with which the brightness is corrected, and said brightness correction device corrects the brightness of said original image for only pixels having brightness equal to or greater than the minimum brightness specified by said brightness specifying device.

4. An image processing apparatus according to claim 1, further comprising a region specifying device for specifying a region of which brightness is to be corrected, and said brightness correction device corrects the brightness of said original image for only pixels included in the region specified by said region specifying device.

5. An image processing program embodied in a computer readable medium for realizing on a computer, a blurred image creating function for creating a blurred image by subjecting an original image to an erosion processing and to a dilation processing, and a brightness correction function for correcting the brightness of said original image based on the blurred image created by said blurred image creating function, wherein said blurred image creating function comprises:
- an opening processing function for realizing an opening processing by subjecting said original image to the erosion processing and to the dilation processing successively;
- a closing processing function for realizing a closing processing by subjecting said original image to the dilation processing and to the erosion processing successively; and
- a brightness average value computing function for computing an average value between brightness of the original image subjected to the opening processing by said opening processing function and brightness of the original image subjected to the closing processing by said closing processing function, to use the computed result as the blurred image.

* * * * *